UNITED STATES PATENT OFFICE.

JOHANN JAKOB BRACK, OF BASLE, SWITZERLAND, ASSIGNOR TO BASLE CHEMICAL WORKS, OF SAME PLACE.

RHODOL DERIVATIVE AND PROCESS OF MAKING SAME.

SPECIFICATION forming part of Letters Patent No. 613,113, dated October 25, 1898.

Application filed April 27, 1898. Serial No. 679,022. (Specimens.)

*To all whom it may concern:*

Be it known that I, JOHANN JAKOB BRACK, chemist, a citizen of the Swiss Republic, residing at Basle, Switzerland, have invented new and useful Improvements in the Manufacture of Dyestuffs of the Phthalein Series, of which the following is a clear and complete specification.

In the Letters Patent No. 596,333, dated December 28, 1897, the ethers of dialkylrhodols, which are obtained by the condensation of the dialkylamidoöxybenzoylbenzoic acids with resorcinal, are described. The commercial use of these coloring-matters is prejudiced by their sensibility to alkalies and by the fact that the shades of the lake they form with ferrocyanid of potassium and oxid of zinc are converted when steamed from a yellowish red into a bluish violet. I have now found that by combining the said ethers of dialkylrhodols with formic aldehyde well-characterized products of condensation are obtained, giving shades which are not altered by alkalies. The lake formed by these products with ferrocyanid of potassium and oxid of zinc yield shades which on steaming remain unchanged. These properties impart a high commercial value to the new colors, which are yellowish-red coloring-matters.

The product which gives the most decided yellowish shade is obtained by the action of one molecule of rhodol on two molecules of formic aldehyde.

The following I have found to be the best way of working the process:

Example: To a solution of forty-two kilograms of the ethyl ether of dimethylrhodol in two hundred kilograms sulfuric acid of 66° Baumé I add a mixture of sixteen kilograms formic aldehyde of forty per cent. and one hundred kilograms sulfuric acid of 66° Baumé. The reaction sets in at once and is marked by a rise of the temperature of the solution. To complete the reaction, I allow the solution to stand for some days at the ordinary temperature and afterward I pour it on ice. The sulfate of the product of condensation remains in the solution and is separated by a solution of common salt as a concreted resinous paste from which the remaining liquid can be decanted.

The sulfate is converted into chlorid by dissolving the former in sixty kilograms of alcohol and seventy kilograms of water and by adding to the hot solution seventy kilograms of hydrochloric acid of 20° Baumé. After some time a solution of common salt is poured in while stirring. The chlorid is thus precipitated as a thick paste, which can be separated from the liquid by decanting the latter.

In its dry form the product of the reaction appears as a brilliant greenish powder. It is soluble in hot water and in alcohol. Its alcoholic solution shows no fluorescence, differing in this respect from the material at starting. In concentrated sulfuric acid the color dissolves with a yellowish-brown tint.

I have not succeeded in getting the new product in crystalline form. From its solutions it separates as a resinous paste.

The new product of condensation dyes tannin-mordanted cotton a yellowish red and on printing with ferrocyanid of potassium and oxid of zinc it yields a lake of the same yellowish-red color, which is not changed by steaming.

What I claim as my invention, and wish to secure by Letters Patent, is—

1. The improvement in the manufacture of dyestuffs of the phthalein series, which consists in condensing an alkyl ether of a dialkyl-rhodol with formic aldehyde.

2. The improvement in the manufacture of dyestuffs of the phthalein series, which consists in condensing the ethyl ether of dimethylrhodol with formic aldehyde.

3. As a new article of manufacture, the herein-described dyestuff, the same being a brilliant greenish powder, which is soluble in hot water and in alcohol, dissolves in concentrated sulfuric acid with a yellowish-brown color, can be separated from its solution as a resinous paste, dyes tannin-mordanted cotton a yellowish red, and on printing with ferrocyanid of potassium and oxid of zinc, yields a lake of the same yellowish-red color, which color is not changed by steaming.

In witness whereof I have hereunto signed my name, this 4th day of April, 1898, in the presence of two subscribing witnesses.

JOHANN JAKOB BRACK.

Witnesses:
 GEORGE GIFFORD,
 AMAND RITTER.